United States Patent
Shayko et al.

(10) Patent No.: US 9,732,477 B2
(45) Date of Patent: Aug. 15, 2017

(54) APPARATUS AND METHOD FOR CONTROLLING AIRBORNE POLLUTION

(71) Applicant: Envision SQ Inc., Guelph (CA)

(72) Inventors: Scott Shayko, Guelph (CA); Xin Qui, Mississauga (CA); Jason Slusarczyk, Harley (CA); William Van Heyst, Kitchener (CA); Shohel Mahmud, Kitchener (CA); William Lubitz, Kitchener (CA); Jennifer Spencer, Tara (CA)

(73) Assignee: Envision SQ Inc., Guelph, Ontario (CA)

( * ) Notice: Subject to any disclaimer, the term of this patent is extended or adjusted under 35 U.S.C. 154(b) by 0 days.

(21) Appl. No.: 14/434,647

(22) PCT Filed: Oct. 8, 2013

(86) PCT No.: PCT/CA2013/000849
§ 371 (c)(1),
(2) Date: Apr. 9, 2015

(87) PCT Pub. No.: WO2014/056074
PCT Pub. Date: Apr. 17, 2014

(65) Prior Publication Data
US 2015/0267356 A1    Sep. 24, 2015

(30) Foreign Application Priority Data
Oct. 10, 2012 (CA) ......................... 2791965

(51) Int. Cl.
*E01C 1/00* (2006.01)
*E01F 8/00* (2006.01)
(Continued)

(52) U.S. Cl.
CPC .............. *E01C 1/005* (2013.01); *B01D 53/62* (2013.01); *B01D 53/85* (2013.01); *E01F 8/0005* (2013.01); *B01D 2258/06* (2013.01)

(58) Field of Classification Search
CPC .............................. E01C 1/005; E01F 8/0029
(Continued)

(56) References Cited

U.S. PATENT DOCUMENTS 4,513,840 A * 4/1985 Johnson .................... B64F 1/26
                                                181/210
6,015,244 A    1/2000 Wells
(Continued)

FOREIGN PATENT DOCUMENTS

DE    2456915 A1 * 8/1976 ............ E01F 8/0029
EP    0066838 A2   12/1982
(Continued)

OTHER PUBLICATIONS

English translation of DE 2456915 A1 provided by ProQuest: "Screens against industrial traffic and similar noise—deflect sound on to sound—absorbing material or into open space," Aug. 12, 1976.*
(Continued)

*Primary Examiner* — Kevin Joyner
*Assistant Examiner* — Holly Mull
(74) *Attorney, Agent, or Firm* — Woods Oviatt Gilman LLP; Dennis B. Danella, Esq.

(57) ABSTRACT

An apparatus for controlling airborne pollution comprises a leeward wall located near a polluted region, and a windward wall located between the leeward wall and the polluted region. The leeward wall and the windward wall are spaced apart so as to define an airflow passageway therebetween. The windward wall extends upwardly to a first wall height. The leeward wall includes an upper portion extending above
(Continued)

the first wall height. The upper portion is adapted to direct airflow downward through the airflow passageway towards at least one opening located below the first wall height for exhausting the airflow from the airflow passageway.

18 Claims, 26 Drawing Sheets

(51) Int. Cl.
    *B01D 53/62*     (2006.01)
    *B01D 53/85*     (2006.01)

(58) Field of Classification Search
    USPC .......................................................... 422/4
    See application file for complete search history.

(56) References Cited

U.S. PATENT DOCUMENTS

| | | | |
|---|---|---|---|
| 8,048,204 B2 | 11/2011 | Qiu et al. | |
| 2002/0104264 A1* | 8/2002 | Chick | E01F 8/027 47/83 |

FOREIGN PATENT DOCUMENTS

| | | | | |
|---|---|---|---|---|
| JP | 2005066462 A | 3/2005 | | |
| JP | 2007051505 A | 3/2007 | | |
| NL | 1031640 | 10/2007 | | |
| SE | WO 9114827 A1 * | 10/1991 | ............ | E01C 1/005 |
| WO | WO9409211 A1 * | 4/1994 | | |
| WO | 2009/058019 A1 | 5/2009 | | |

OTHER PUBLICATIONS

English machine translation of Doc. No. WO 1994009211 A1 provided by Proquest: Soundproofing member and use thereof, Vallade, Apr. 28, 1994.*

Hokkanen, Flores P., "Extended Search Report," mailed May 2, 2016, dated Apr. 21, 2016 for European Patent Application No. 13845176.0, European Patent Office, Munich, Germany 80298.

Wen, Yihui, "Notification of the First Office Action (PCT Application in the National Phase)," mailed Jun. 6, 2016 for Chinese Patent Application No. 201380062455.X, State Intellectual Property Office of China, Heiden, Beijing, China 100088.

* cited by examiner

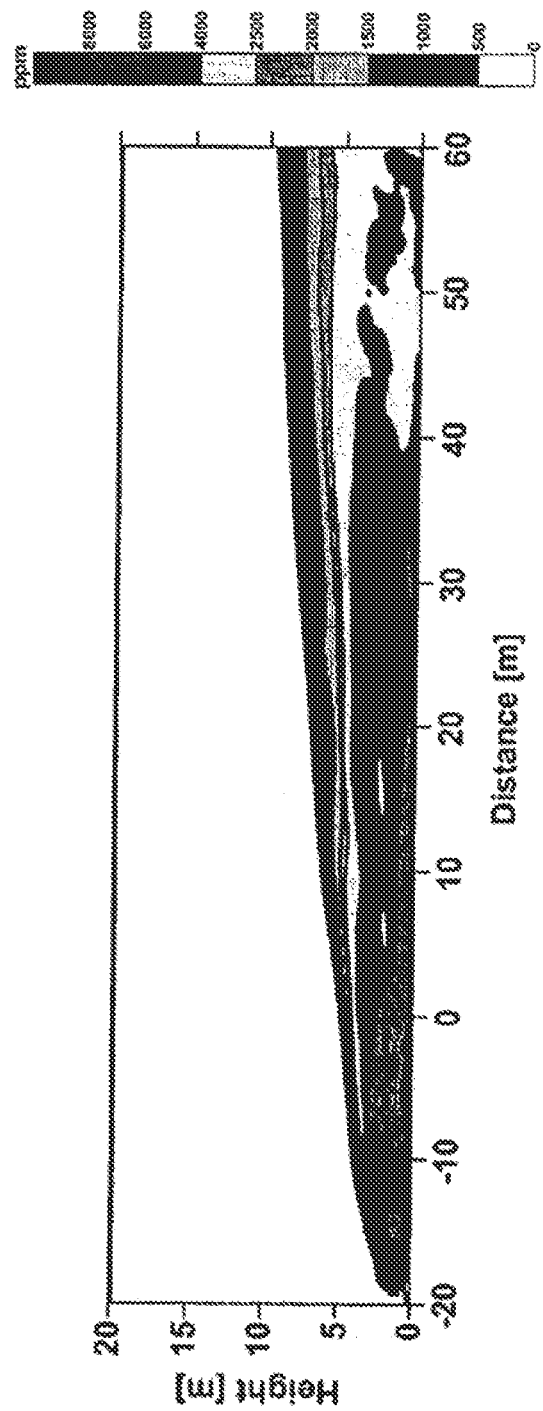
FIG. 4(a): Average Concentration of Pollutants for 1.39 m/s Airflow with no wall

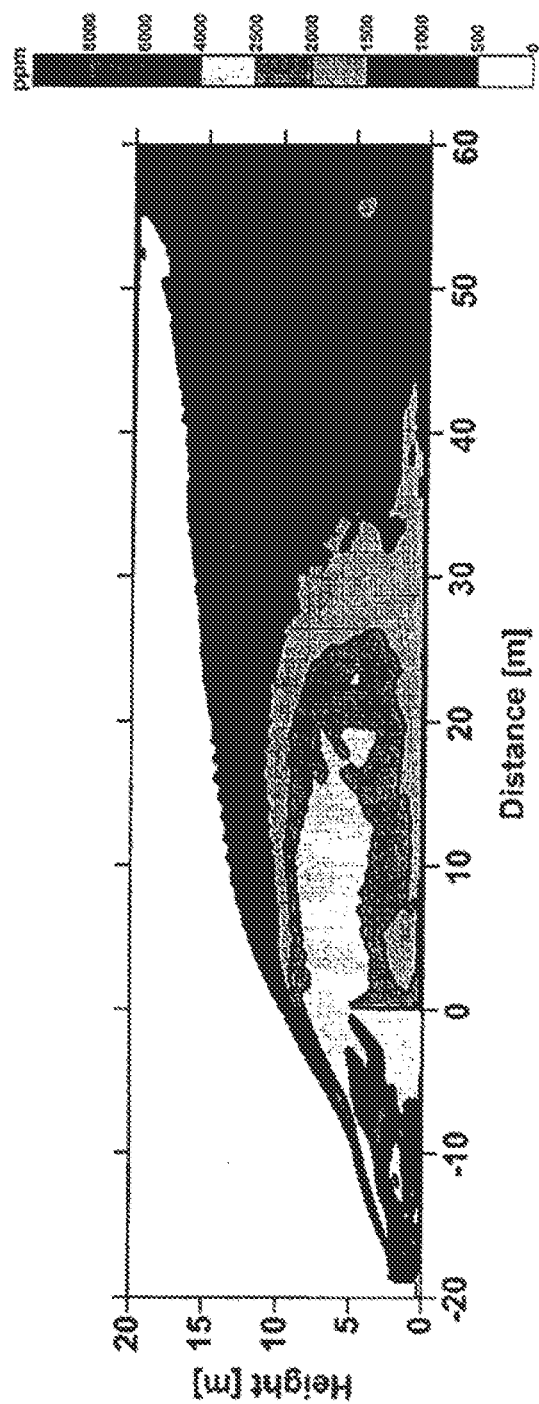
FIG. 4(b): Average Concentration of Pollutants for 1.39 m/s Airflow with standard straight wall

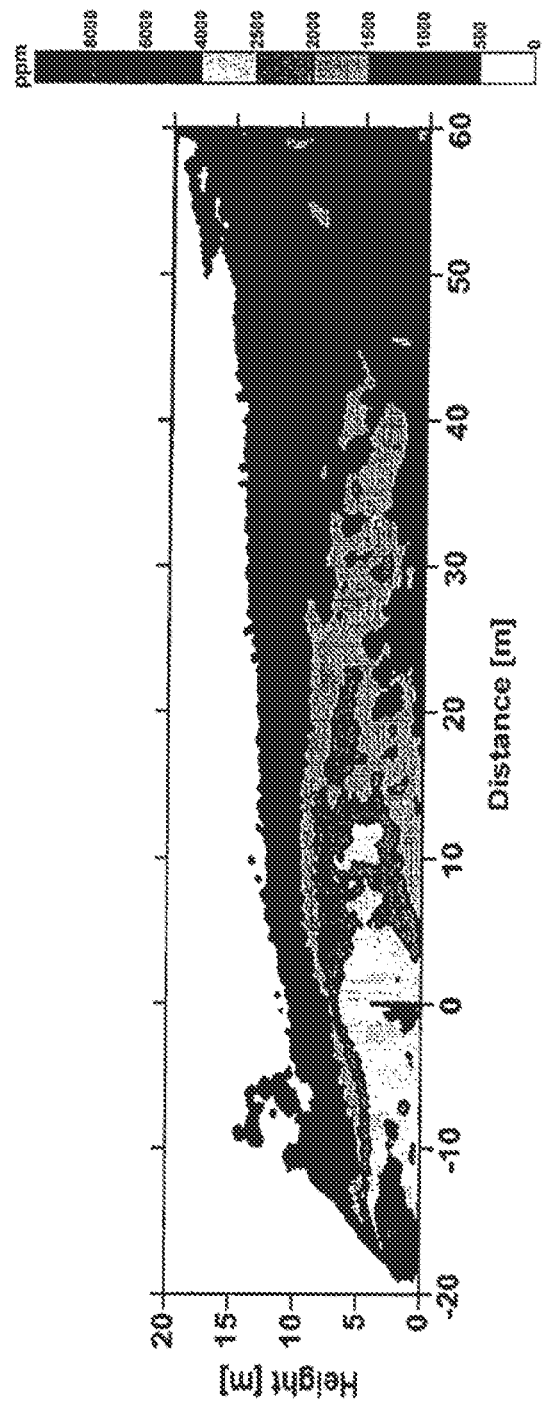
FIG. 4(c): Average Concentration of Pollutants for 1.39 m/s Airflow with exemplary device

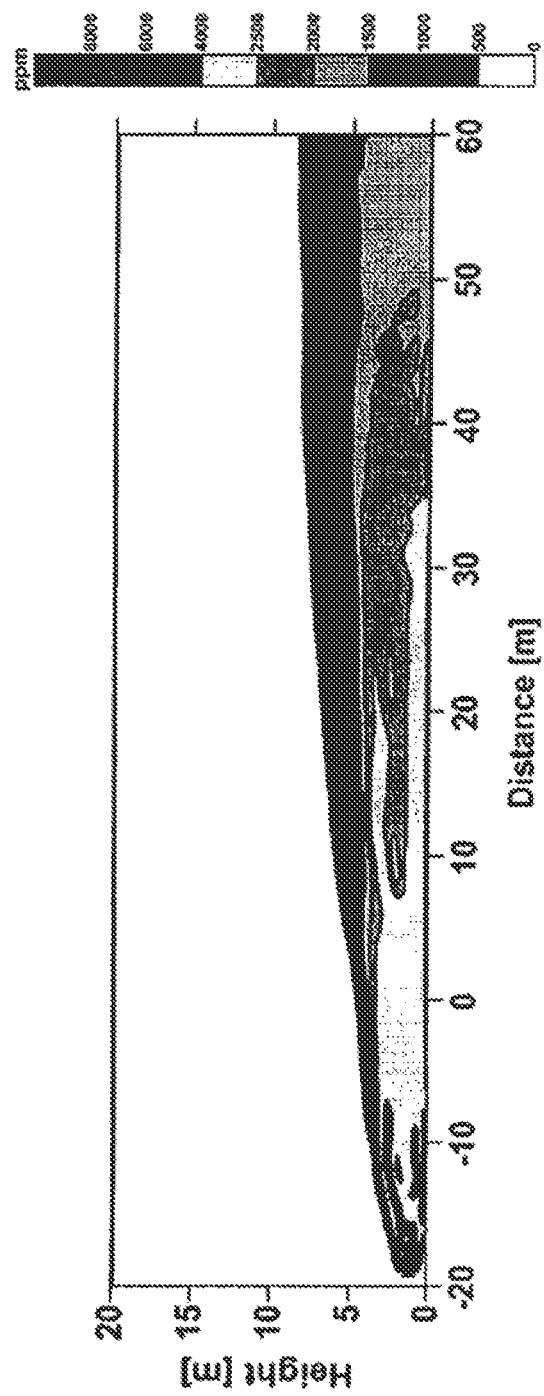
FIG. 5(a): Average Concentration of Pollutants for 2.78 m/s Airflow with no wall

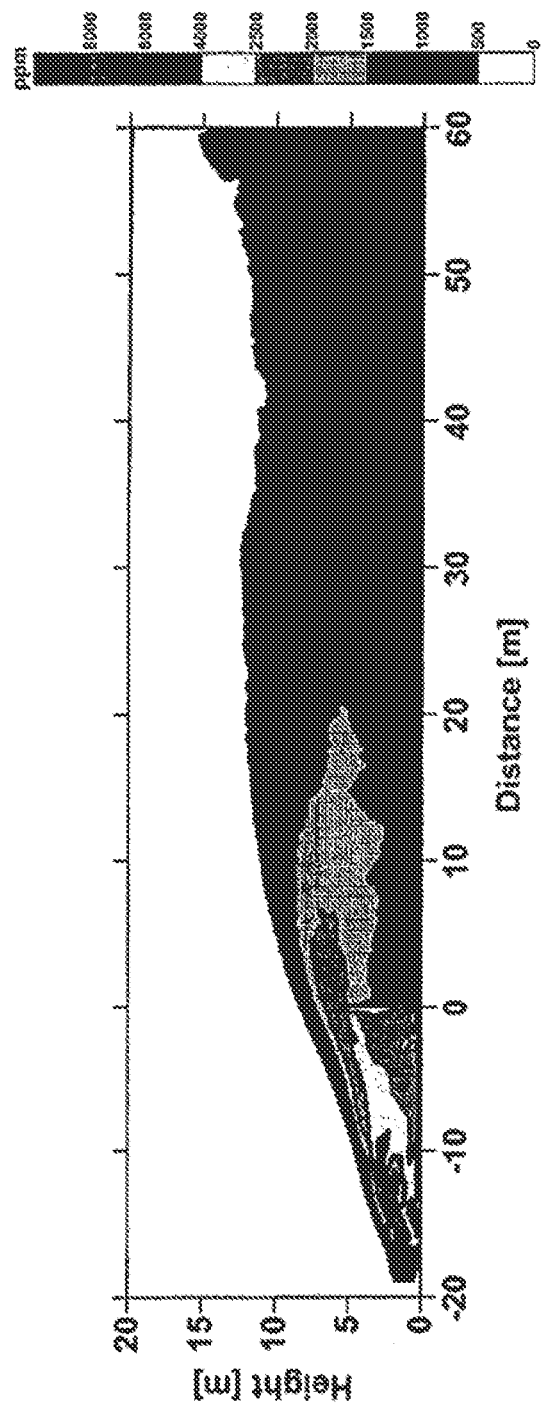
FIG. 5(b): Average Concentration of Pollutants for 2.78 m/s Airflow with standard straight wall

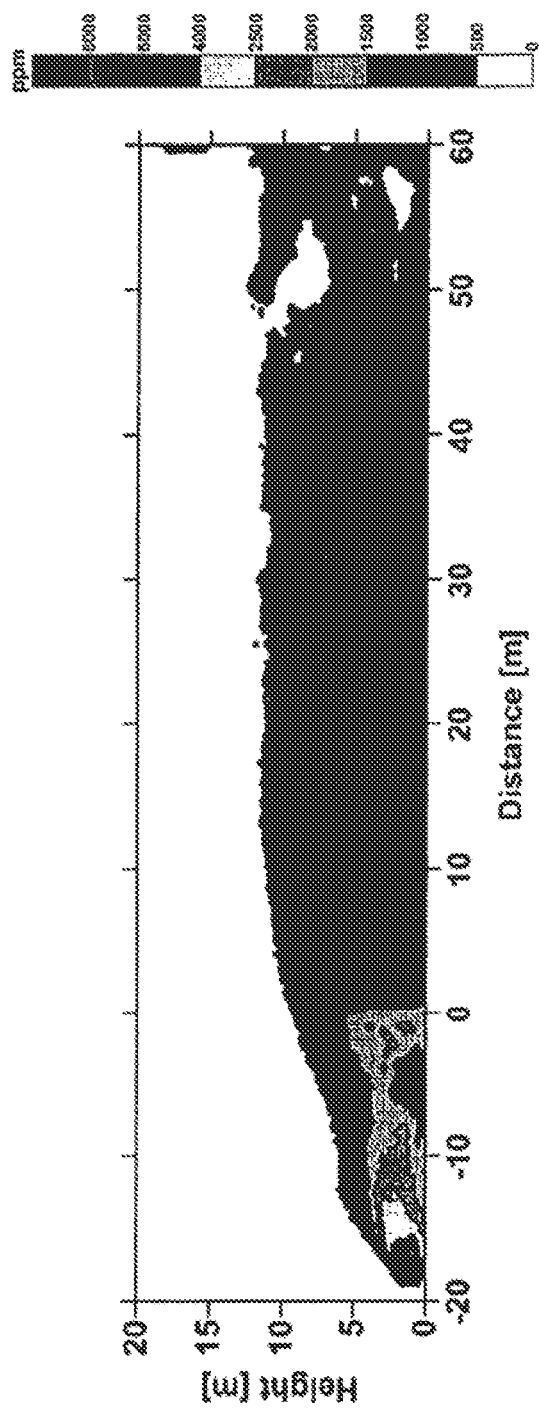
FIG. 5(c): Average Concentration of Pollutants for 2.78 m/s Airflow with exemplary device

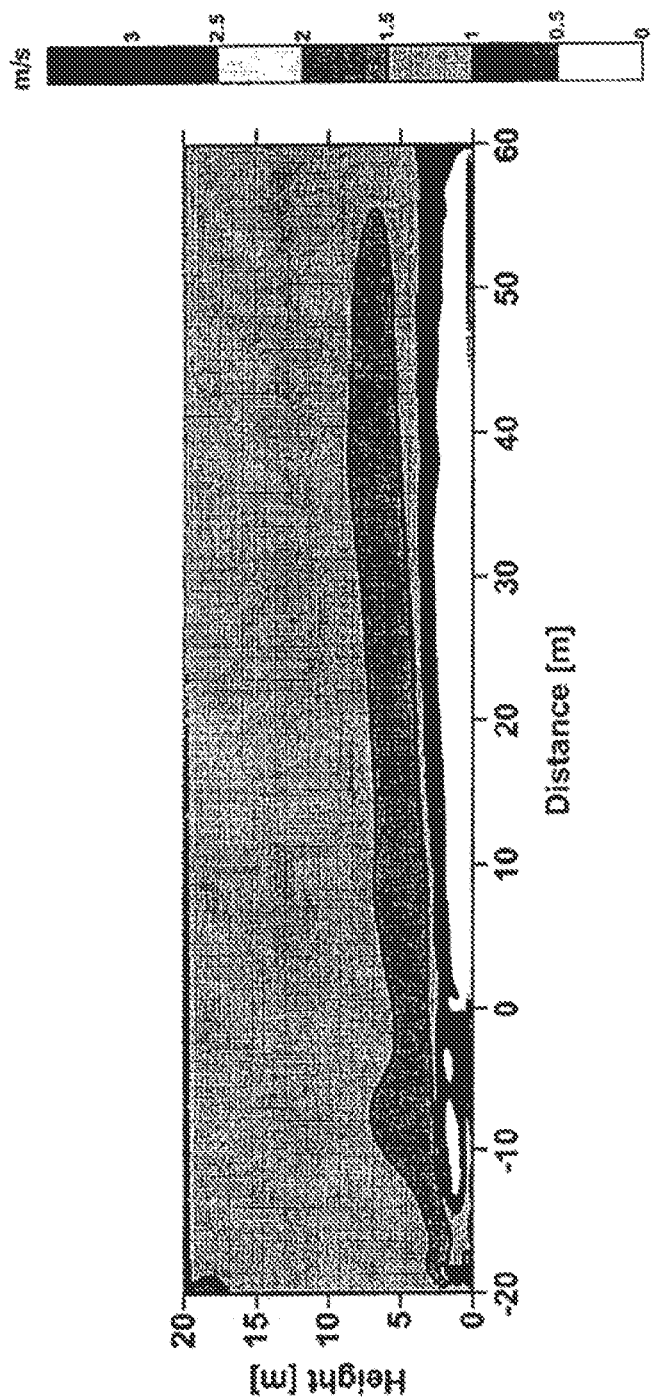
FIG. 6(a): Average Airflow Velocity for 1.39 m/s Airflow with no wall

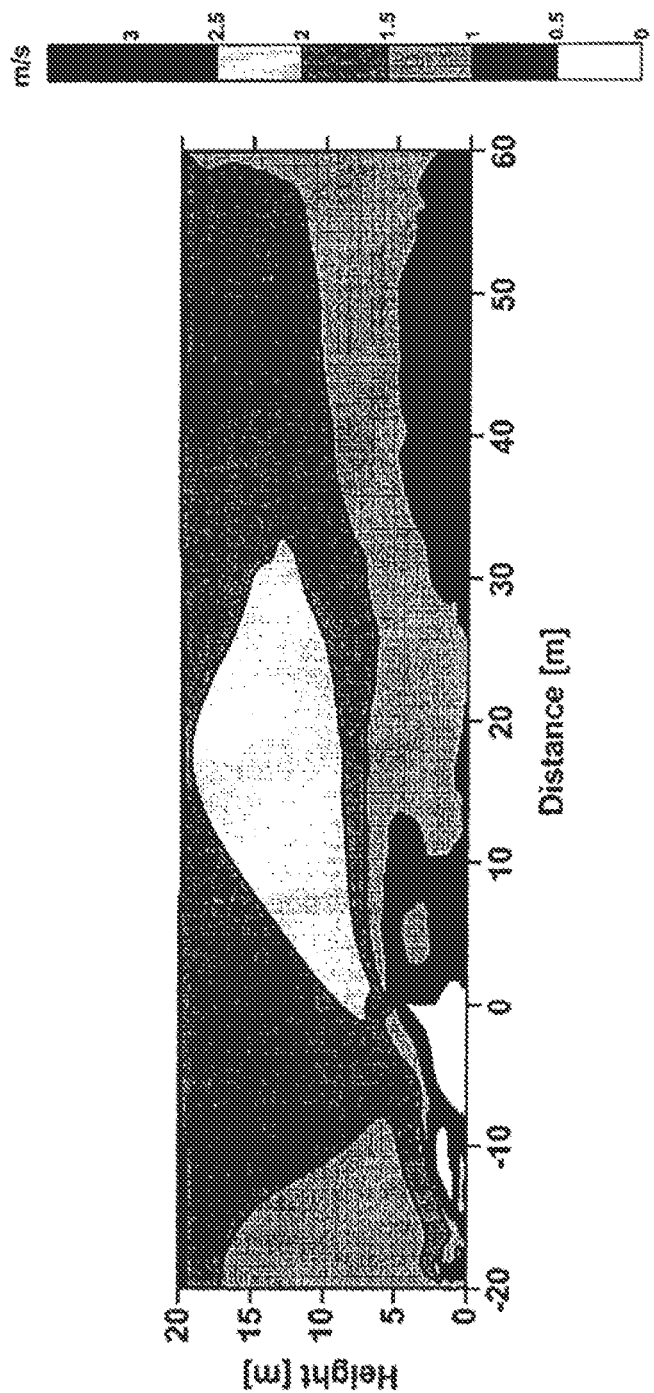
FIG. 6(b): Average Airflow Velocity for 1.39 m/s Airflow with standard straight wall

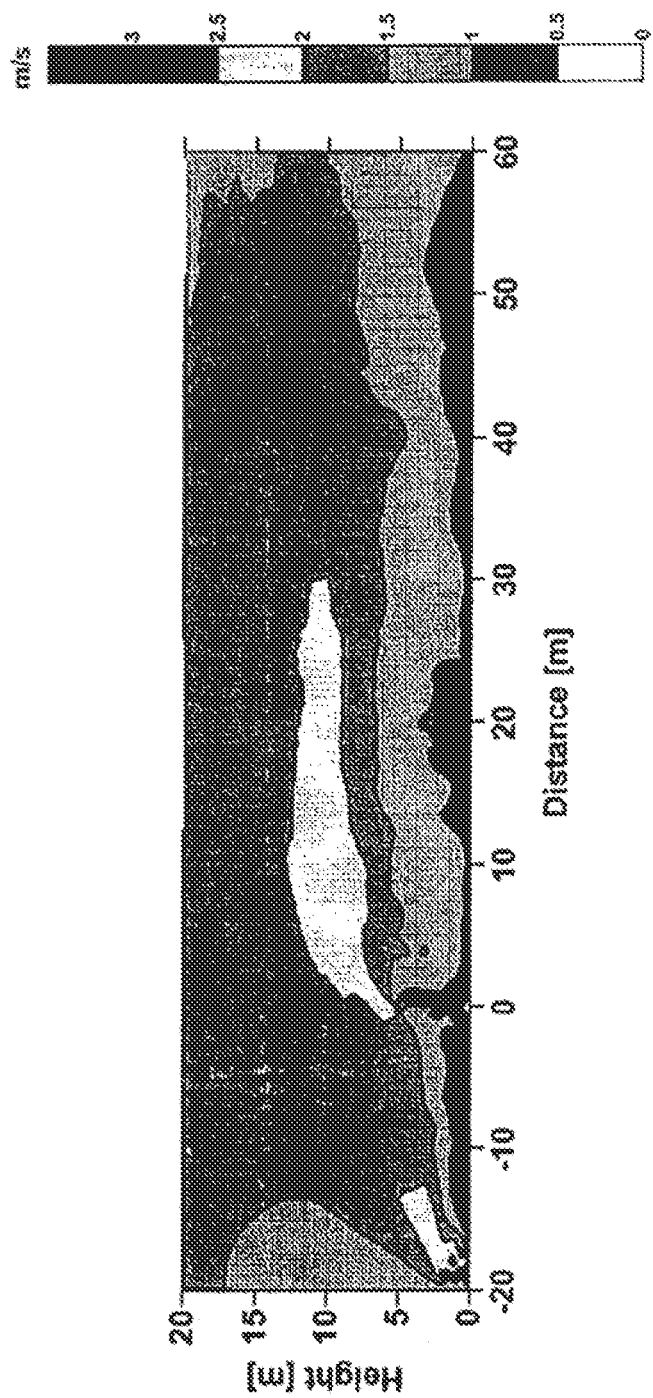
FIG. 6(c): Average Airflow Velocity for 1.39 m/s Airflow with exemplary device

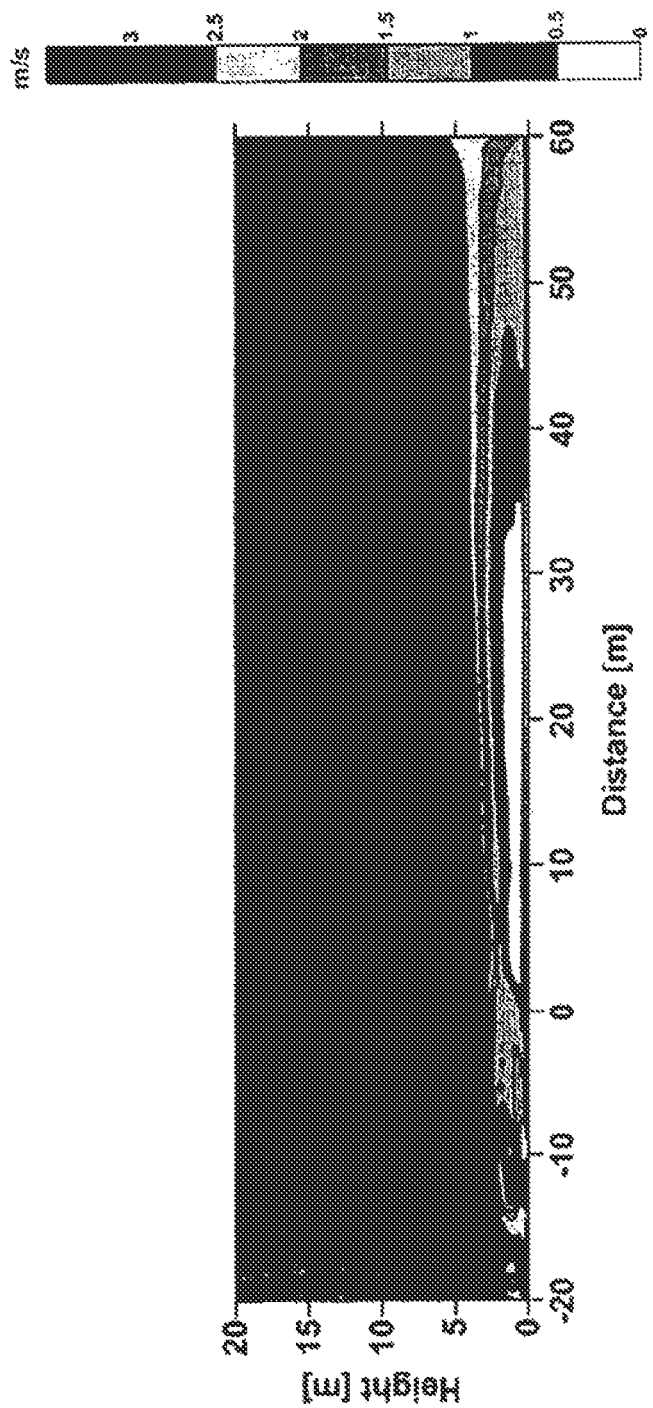
FIG. 7(a): Average Airflow Velocity for 2.78 m/s Airflow with no wall

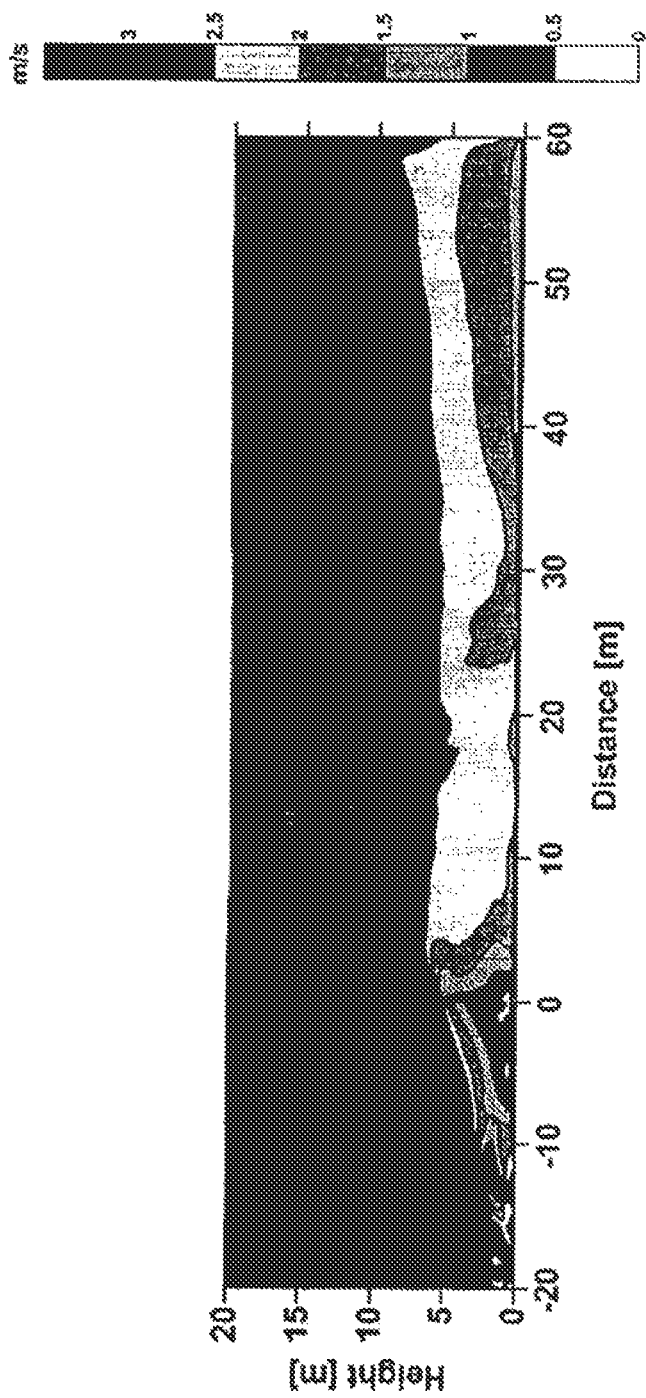
FIG. 7(b): Average Airflow Velocity for 2.78 m/s Airflow with standard straight wall

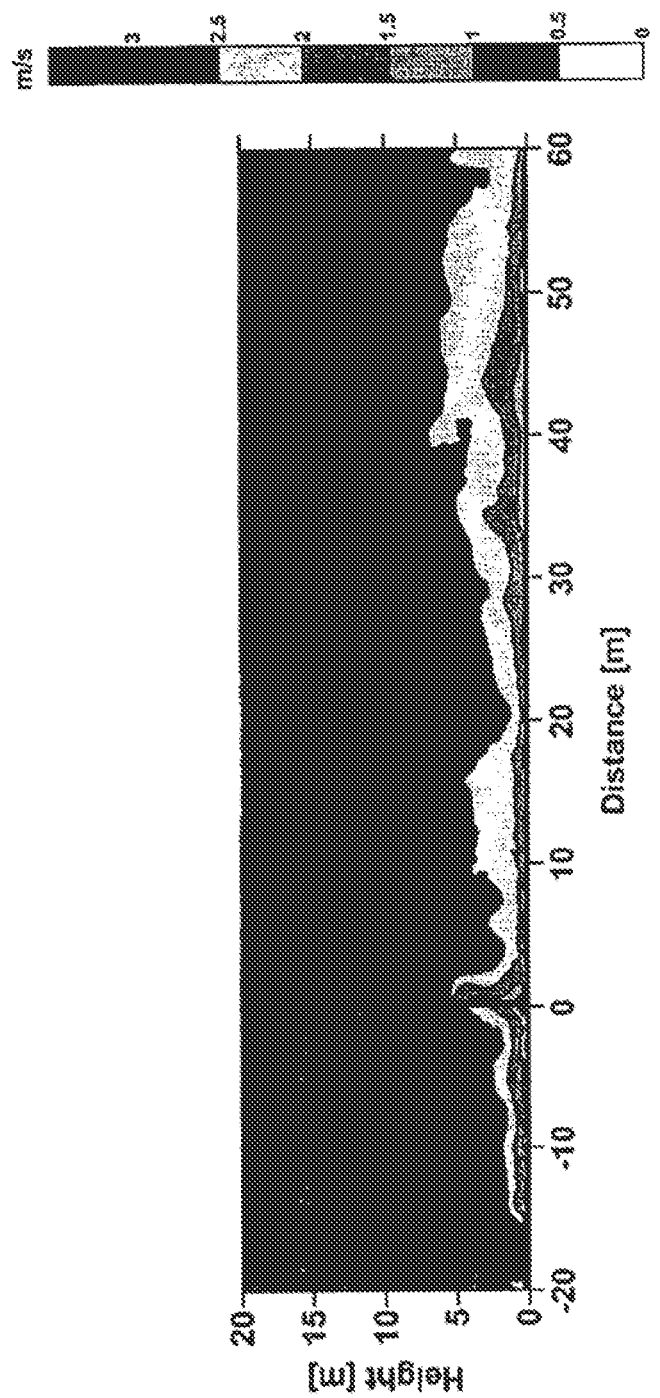
FIG. 7(c): Average Airflow Velocity for 2.78 m/s Airflow with exemplary device

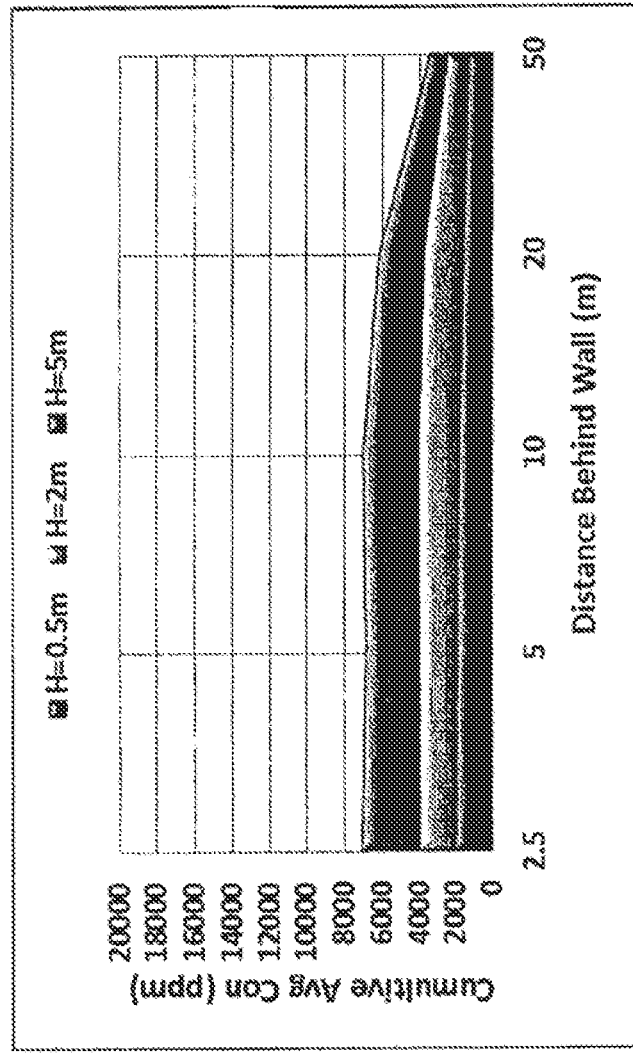
FIG. 8(a): Cumulative Average Pollutant Concentration for 1.39 m/s Airflow with Standard Straight Wall – CFD Model

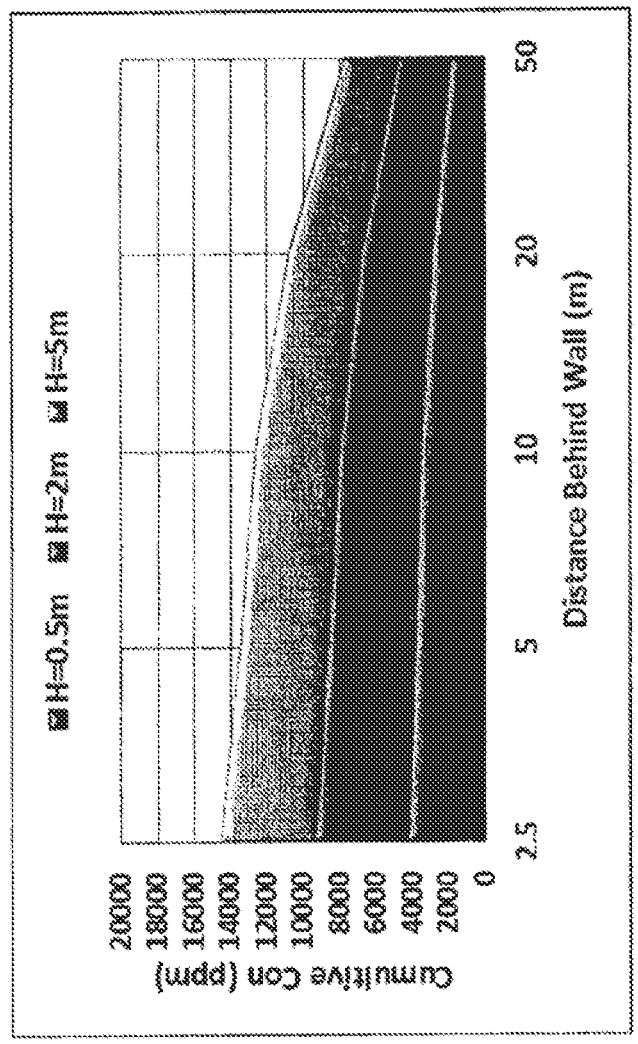
FIG. 8(b): Cumulative Average Pollutant Concentration for 1.39 m/s Airflow with Standard Straight Wall – Wind Tunnel

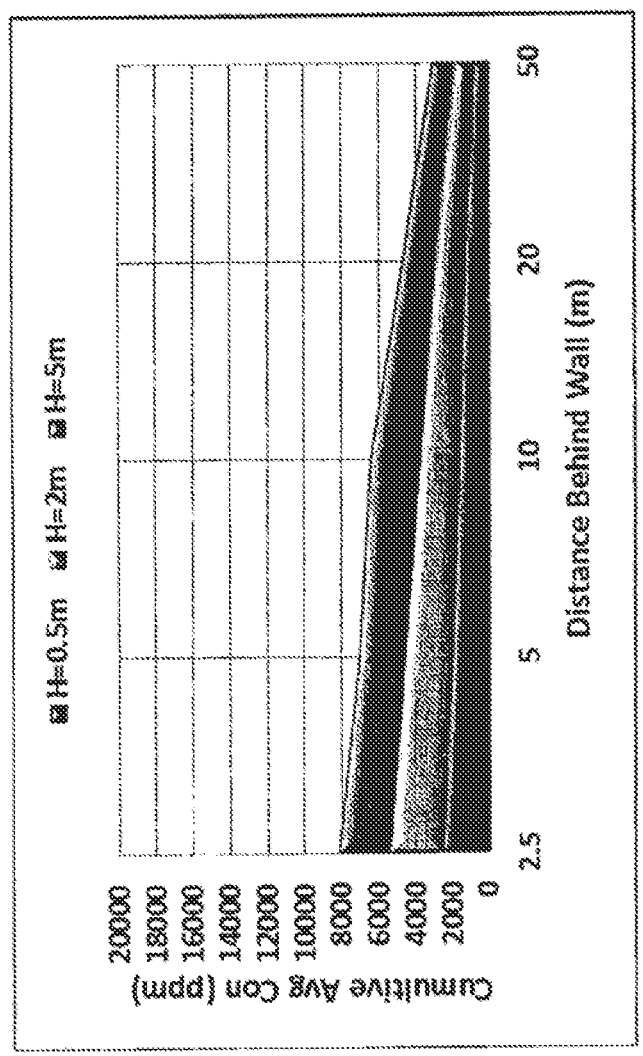
FIG. 8(c): Cumulative Average Pollutant Concentration for 1.39 m/s Airflow with Exemplary Device — CFD Model

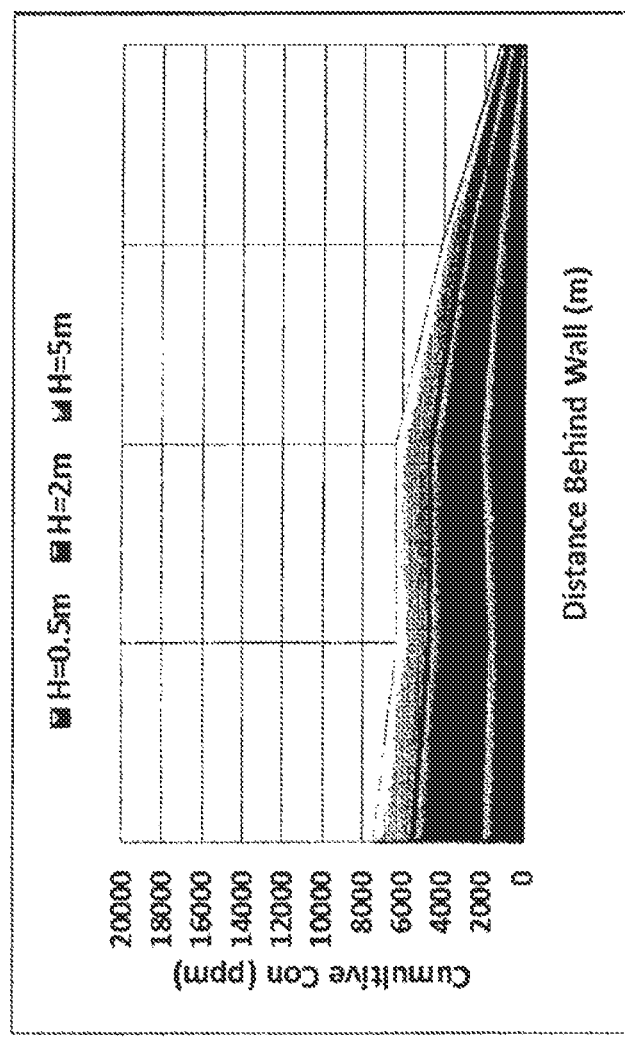
FIG. 8(d): Cumulative Average Pollutant Concentration for 1.39 m/s Airflow with Exemplary Device – Wind Tunnel

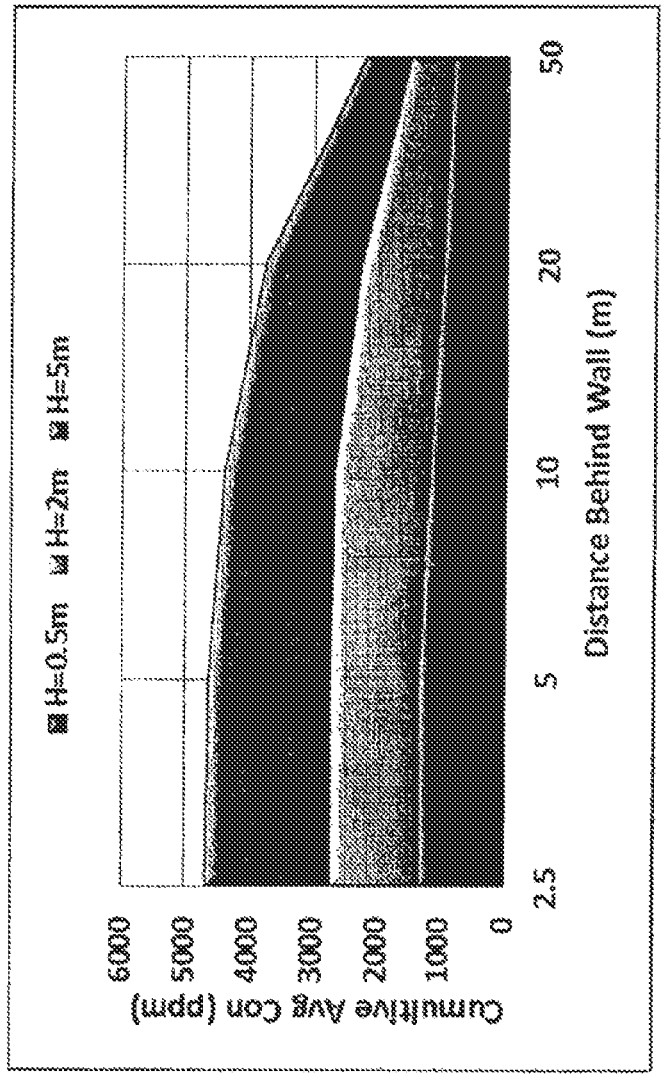
FIG. 9(a): Cumulative Average Pollutant Concentration for 2.78 m/s Airflow with Standard Straight Wall – CFD Model

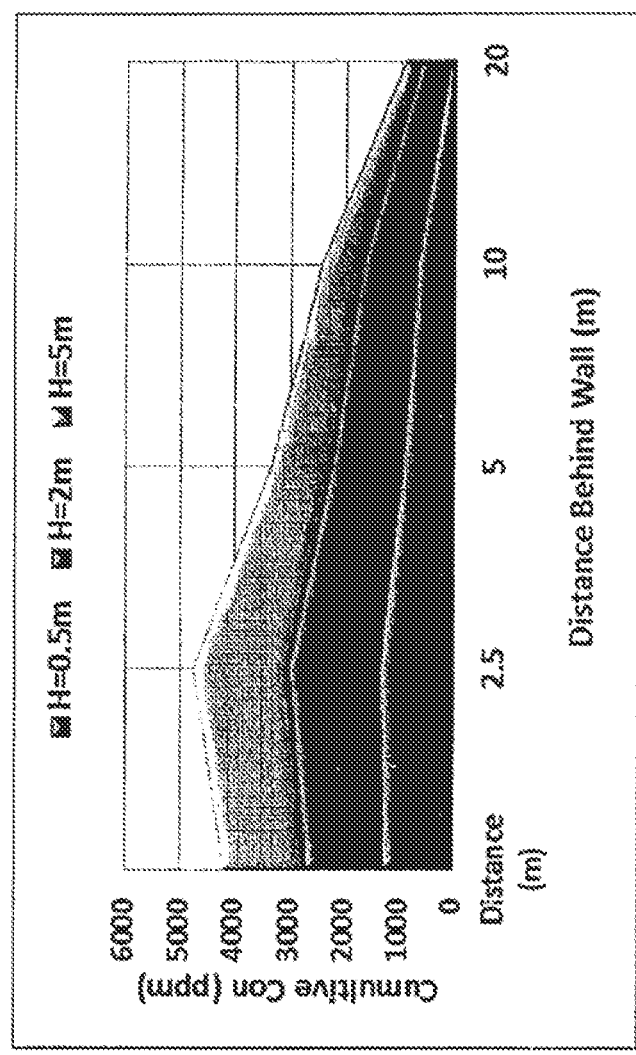
FIG. 9(b): Cumulative Average Pollutant Concentration for 2.78 m/s Airflow with Standard Straight Wall – Wind Tunnel

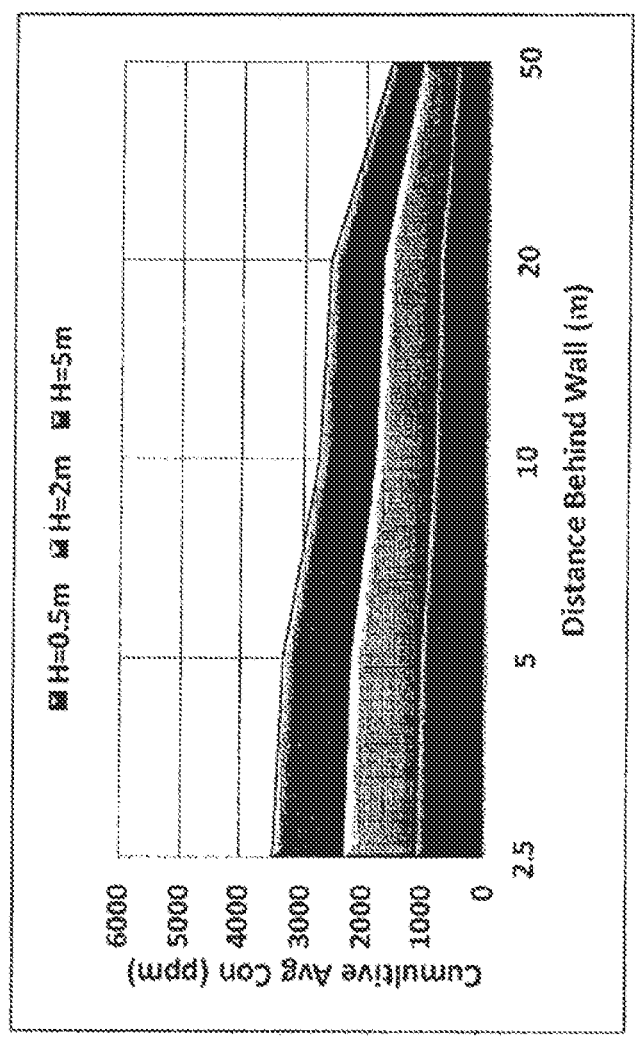
FIG. 9(c): Cumulative Average Pollutant Concentration for 2.78 m/s Airflow with Exemplary Device – CFD Model

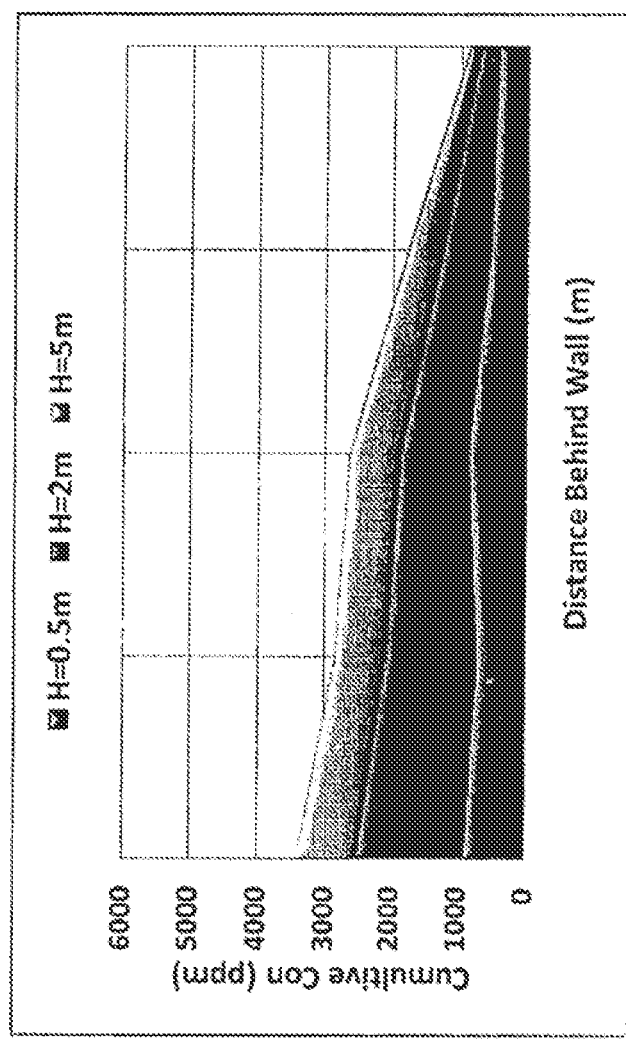
FIG. 9(d): Cumulative Average Pollutant Concentration for 2.78 m/s Airflow with Exemplary Device – Wind Tunnel

APPARATUS AND METHOD FOR CONTROLLING AIRBORNE POLLUTION

RELATED APPLICATIONS

This application is a National Stage filing under 35 U.S.C. 371 of International Application No. PCT/CA2013/000849, filed Oct. 8, 2013, which in turn claims priority to Canadian Patent Application No. 2,791,965, filed on Oct. 10, 2012 and entitled "APPARATUS AND METHOD FOR CONTROLLING AIRBORNE POLLUTION", the entire contents of which are hereby incorporated by reference herein for all purposes.

TECHNICAL FIELD

One or more embodiments herein relate to apparatus and methods for controlling airborne pollution, and in particular for controlling airborne pollution near roadways.

INTRODUCTION

Airborne pollution is an on-going environmental concern. One particular example of airborne pollution is roadway pollution resulting from emissions from vehicles traveling on roadways such as highways. These emissions can significantly impact air quality in areas around the roadway, especially within 300 meters of the roadway. This can be particularly problematic if the roadway is located near a residential area.

Some techniques have been developed in an attempt to control roadway pollution. For example, U.S. Pat. No. 8,048,204 (Qiu et al.) discloses a method of mixing polluted air with less polluted air to create moderately polluted air. Specifically, the method of Qiu involves dividing air near a roadway into a "lower part" that tends to be high in pollution and an "upper part" that tends to be less polluted. The polluted air from the lower part is forced upwards between two walls and then exits the top of the walls where it intersects with the less polluted air from the upper part. This intersection mixes the two air streams together to provide moderately polluted air above the wall. Afterwards, the moderately polluted air continues flowing downwind.

In effect, Qiu et al. describes diluting the polluted air by mixing it with less polluted air, thereby reducing the concentration of the airborne pollutants without reducing the overall number of airborne pollutants.

SUMMARY

According to some embodiments, there is provided an apparatus for controlling airborne pollution. The apparatus comprises a leeward wall located near a polluted region, and a windward wall located between the leeward wall and the polluted region. The leeward wall and the windward wall are spaced apart so as to define an airflow passageway therebetween. The windward wall extends upwardly to a first wall height. The leeward wall includes an upper portion extending above the first wall height. The upper portion is adapted to direct airflow downward through the airflow passageway towards at least one opening located below the first wall height for exhausting the airflow from the airflow passageway.

The at least one opening may be adapted to exhaust the airflow towards a leeward region that is downwind of the leeward wall.

The leeward wall may have a lower portion located below the first wall height, and the at least one opening may be located through the lower portion.

The upper portion of the leeward wall may be formed with a deflector for directing the airflow down into the airflow passageway. The deflector may at least partially overhang the airflow passageway. The deflector may be angled or curved.

The apparatus may also comprise at least one pollution removal device for removing pollutants from the airflow. The pollution removal device may be located downwind from the at least one opening. The pollution removal device may be located adjacent the leeward wall. The pollution removal device may include vegetative material.

According to some embodiments, there is provided an apparatus for controlling airborne pollution. The apparatus comprises a leeward wall for placement near a polluted region, and a windward wall for placement between the leeward wall and the polluted region so as to extend upwardly to a first wall height. The leeward wall is spaced apart from the windward wall so as to provide an airflow passageway therebetween. The leeward wall includes an upper portion extending above the first wall height. The upper portion is adapted to direct airflow downward through the airflow passageway towards at least one opening located below the first wall height for exhausting the airflow from the airflow passageway.

According to soma embodiments, there is provided a method for controlling airborne pollution. The method comprises positioning at least one of a windward wall and a leeward wall near a polluted region. The windward wall being located between the leeward wall and the polluted region. The leeward wall being spaced apart from the windward wall so as to provide an airflow passageway therebetween. The method also comprises directing airflow downward through the airflow passageway towards at least one opening for exhausting the airflow from the airflow passageway.

The method may also comprise exhausting the airflow towards a leeward region that is downwind of the leeward wall.

The airflow may be directed downward info the airflow passageway by an upper portion of the leeward wall that extends above the windward wall. The airflow may be directed downward into the airflow passageway by a detector formed on the upper portion of the leeward wall.

In some examples, the positioning step may include positioning both the windward wall and the leeward wall. Furthermore, the windward wall and the leeward wall may be positioned contemporaneously. Alternatively, one of the windward wall and the leeward wall may be positioned subsequently to the other of the windward wall and the leeward wall.

In other examples, the positioning step may include positioning only one of the windward wall and the leeward wall. For example, one of the windward wall and the leeward wall may be positioned as part of a retrofit to the other of the windward wall and the leeward wall.

Other aspects and features will become apparent to these ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification and are not intended to limit the scope of what is taught. In the drawings:

FIG. 4 is a series of graphical charts comparing simulated average pollutant concentration within a low speed airflow adjacent to a roadway for: (a) no wall, (b) a straight wall, and (c) an exemplary apparatus according to at least some of the teachings herein;

FIG. 5 is a series of graphical charts comparing simulated average pollutant concentration within a higher speed airflow adjacent a roadway for: (a) no wall, (b) a straight wall, and (c) an exemplary apparatus according to at least some of the teachings herein;

FIG. 6 is a series of graphical charts comparing simulated average airflow velocity for a low speed airflow moving across: (a) no wall, (b) a straight wall, and (c) an exemplary apparatus according to at least some of the teachings herein;

FIG. 7 is a series of graphical charts comparing simulated average airflow velocity for a higher speed airflow moving across: (a) no wall, (b) a straight wall, and (c) an exemplary apparatus according to at least some of the teachings herein;

FIG. 8 is a series of graphical charts comparing cumulative average pollutant concentration for a low speed airflow moving across: (a) a straight wall in a CFD model, (b) a straight wall in a wind tunnel, (c) an exemplary apparatus according to at least some of the teachings herein in a CFD model, and (d) an exemplar apparatus according to at least some of the teachings herein in a wind tunnel;

FIG. 9 is a series of graphical charts showing cumulative average pollutant concentration for a higher speed airflow moving across: (a) a straight wall in a CFD model, (b) a straight wall in a wind tunnel, (c) an exemplary apparatus according to at least some of the teachings herein in a CFD model, and (d) an exemplary apparatus according to at least some of the teachings herein in a wind tunnel;

DETAILED DESCRIPTION

Figure 1:
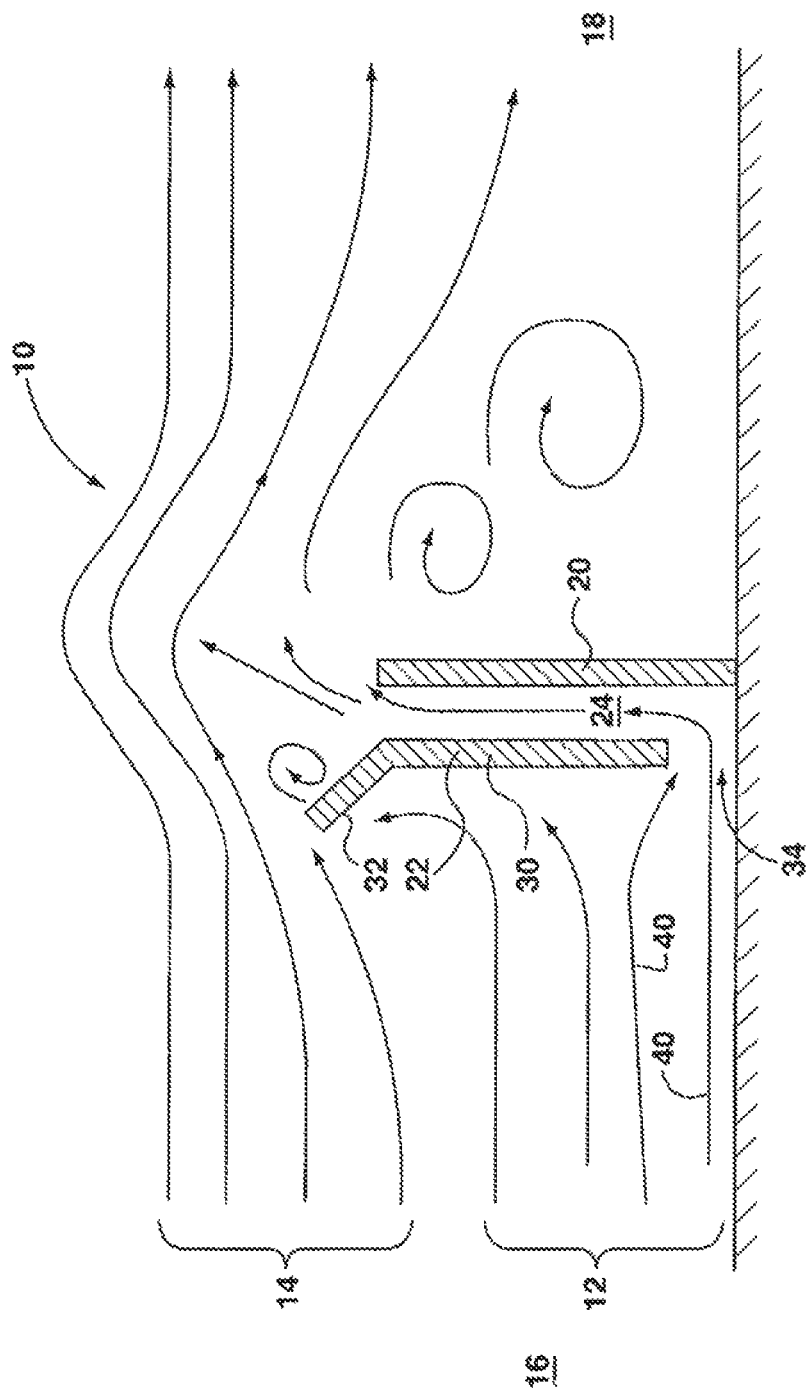
FIG. 1 is a side elevation view of a prior art wall assembly, from the Qiu et al. reference, for forcing, policed air upwardly between two walls to mix with less polluted air.

Referring to FIG. 1, illustrated therein is a prior art wall assembly 10 as generally described in U.S. Pat. No. 8,048,204 (Qiu et al.). The prior art wall assembly 10 forces polluted air 12 upwardly to mix with less polluted air 14 above the wall assembly 10 so as to provide moderately polluted air above the wall assembly 10. The less polluted air 14 is normally at a higher elevation in the airstream, and while it tends to include some roadway pollutants, they are normally at lower concentrations as compared to the polluted air 12.

The wall assembly 10 includes an outer wall 20 located near a roadway region 16 and an inner wall 22 that is positioned between the roadway region 16 and the outer wall 20. The inner wall 22 and outer wall 20 are spaced apart to define a channel 24 therebetween.

The inner wall 22 includes a lower portion 30 extending vertically. The lower portion 30 has aperture 34 for directing a lower part 40 of the polluted air 12 into the channel 24 and then forcing that polluted air upwardly through the channel 24 so as to mix with the less polluted air 14 above the wall assembly 10. This mixing creates the moderately polluted air above the wall assembly 10.

The inner wall 22 also includes a deflector 32 positioned on top of the lower portion 30. The deflector extends 32 toward the roadway region 16. According to Qiu et al, when an upper part 42 of the polluted air 12 impinges the lower portion 30 it creates a high pressure region that directs the upper part 42 of the polluted air 12 upwardly over the deflector 32 to mix with the loss polluted air 14.

Generally, the prior art wall assembly 10 is designed to reduce the pollutant concentration at low elevations near a leeward region 18 located downwind of the wall assembly 10. However, the pollution concentration at higher elevations is increased. This is problematic because the pollutants located at higher elevations tend to be carried further downwind beyond the leeward region 18, and may eventually settle to the ground (e.g. throughout a residential neighborhood). Thus, while the wall assembly 10 may be useful for reducing the concentration of pollution in the leeward region 18 near the wall assembly 10, the overall quantity of pollutants is unchanged. Instead, the pollutants are simply dispersed over a greater area.

Figure 2:
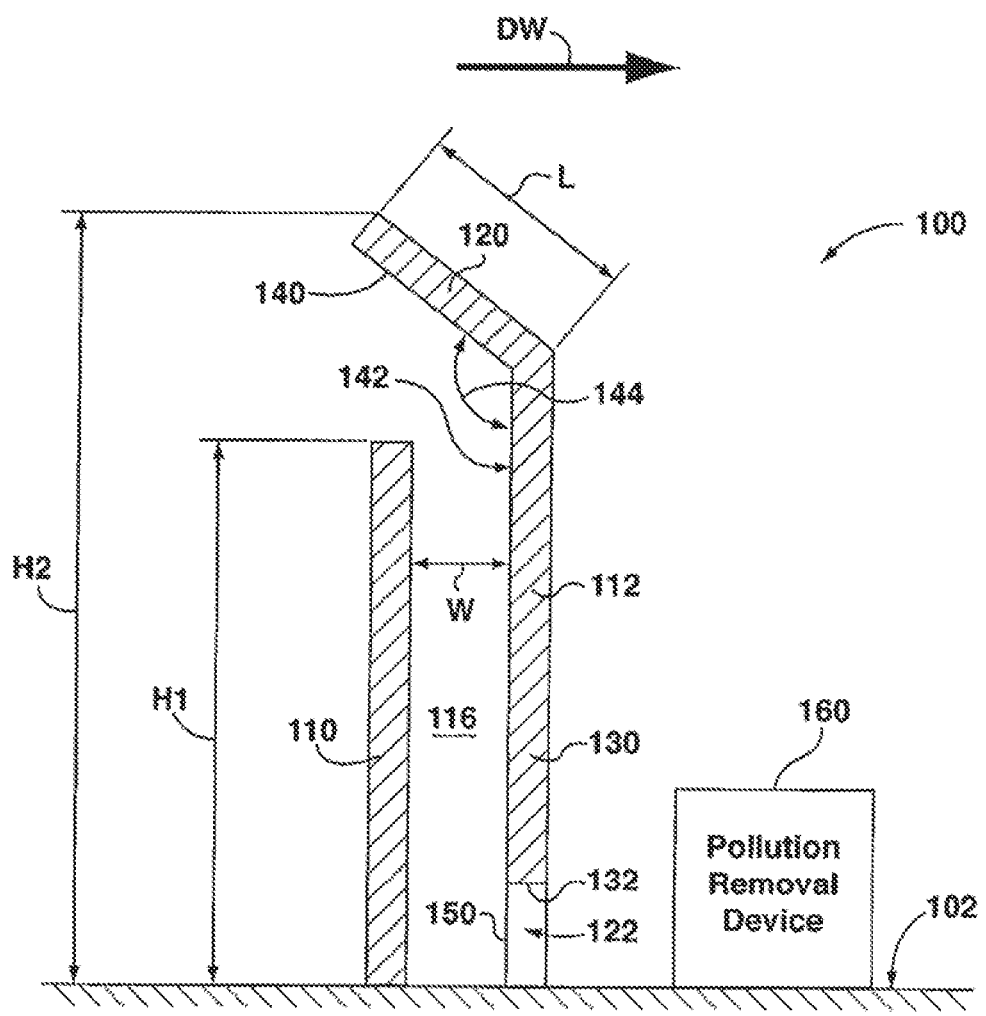
FIG. 2 is a side elevation view of an apparatus for controlling airborne pollution according to one embodiment.
Figure 3:
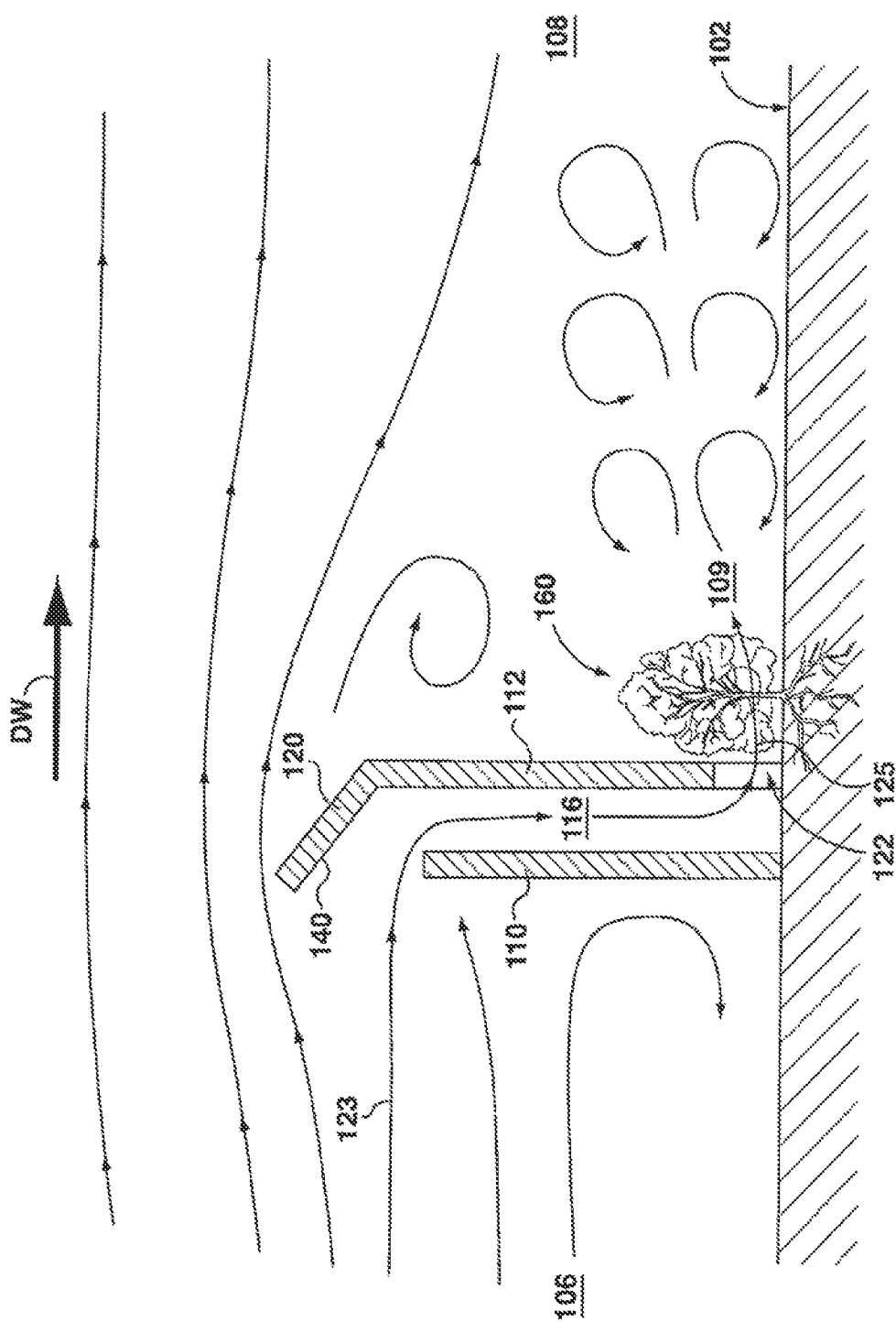
FIG. 3 is a schematic side elevation view of the apparatus of FIG. 2 having a pollution removal device that includes a plant.

Turning now to FIGS. 2 and 3, illustrated therein is an apparatus 100 for controlling airborne pollution according to at least some of the teachings herein.

In general, the apparatus 100 is adapted to direct polluted air downwardly through an airflow passageway between opposed walls. This downward movement can help control the polluted air. For example, the downward airflow may encourage entrained pollutants to fall and settle on a ground surface 102 near the base of the apparatus 100. This can help reduce the quantity of airborne pollutants further downwind from the apparatus 100 and can result in an overall reduction of pollution in the air.

In some cases, the polluted air near the base of the wall may be collected or captured using a pollution removal device 160, which may enhance removal of airborne pollutants.

In some cases, the apparatus 100 may increase the concentration of airborne pollutants at or near the base of the leeward side of the apparatus 100. This may increase the overall efficiency of a pollution removal device 160, and may reduce the quantity of airborne pollutants further downwind from the apparatus 100.

Returning again to FIG. 2, in the illustrated embodiment, the apparatus 100 includes a windward wall 110 (also called an inner wall) and a leeward wall 112 (also called an outer wall). The walls 110, 112 may be placed on or over the ground surface 102. For example, the walls 110, 112 may be supported by a footing or another type of foundation.

The walls 110, 112 are generally located near a polluted region 106. For example, the walls 110, 112 may be located within 50 meters of a roadway or another polluted region 106. In other examples, the walls 110, 112 could be located closer or further away from the polluted region 106.

In some examples, the walls 110, 112 may be placed "downwind" from the polluted region 108. For example, as shown in FIGS. 2 and 3, the "downwind" direction has been defined as generally referring to a direction extending from left to right as indicated by the arrow DW, although it will be understood that the actual wind direction may vary in practice.

More generally, the walls 110, 112 may be placed between the polluted region 106 and an area where pollution control is desired (e.g. a residential neighborhood).

In some examples, the polluted region 106 may be a roadway such as a highway. Accordingly, the polluted region 108 may include roadway pollutants such as emissions from a vehicle, roadside dust or debris, and the like.

In some embodiments, the apparatus 100 could also be used to control other types of airborne pollution that are not necessarily located near a roadway. For example, the apparatus 100 could be located near an industrial facility and used to control airborne pollutants released from the facility. The apparatus 100 could also be deployed near a dust or debris prone area, such as a construction site, a railway, or an airport.

As shown in FIGS. 2 and 3, the windward wall 110 is located between the leeward wall 112 and the polluted region 106. Furthermore, the leeward wall 112 and the windward wall 110 are spaced apart so as to provide an airflow passageway 116 (or channel) therebetween.

The airflow passageway 116 generally has a passage width W selected to facilitate airflow therethrough. For example, the passage width W may be between about 10 centimeters and about 100 centimeters in some embodiments. In other examples, the passage width W could be larger or smaller.

As shown in FIG. 2, the leeward wall 112 is generally taller than the windward wall 110. For example, the windward wall 110 in this example extends upwardly to a first wall height H1 above the ground surface (also called a "support surface"), while the leeward wall 112 extends upwardly to a second wall height H2 that is larger than the first wall height H1.

The wall heights H1, H2 may be selected based on the particular characteristics of the polluted region 106 as well as other characteristics of the surrounding environment or operating circumstances. In some cases, the wall heights H1, H2 may be selected with a view towards controlling a particular percentage of pollutants in the air depending on the relative concentrations of pollutants at different heights.

In some examples, the first wall height H1 may be between about 2 meters and 8 meters. In some particular examples, the first wall height H1 may be about 5 meters.

In some examples, the second wall height H2 may be taller than the first wall height H1 by between about 0.2 meters to about 1 meter. In some particular examples, the second wall height H2 may be about 0.5-meters taller than the first wall height H2 (e.g. the second wall height H2 may be about 5.5 meters when the first wall height H1 is 5 meters). In other examples, the difference between the first wall height and the second wall height may be larger or smaller.

While some exemplary wall heights H1, H2 have been described, in other examples the wall heights H1, H2 could be larger or smaller.

As shown, the leeward wall 112 includes an upper portion 120 extending upwardly above the first wall height H1. With reference to FIG. 3, the upper portion 120 is adapted to direct at least a portion 123 of airflow downwardly through the airflow passageway 116. That portion 123 of the airflow may have a higher pollutant concentration in comparison to other portions of the airflow (particularly those portions of the airflow at a higher elevation).

The portion 123 of the airflow directed downwards into the airflow passageway 116 then flows towards one or more openings 122. The opening 122 is generally located below the first wall height H1, and more particularly the opening 122 may be located at or near the base of the leeward wall 112.

As described above, directing the airflow downwards within the airflow passageway 116 towards the opening 122 can help control airborne pollution. For example, the downward airflow may carry entrained pollutants downward towards the ground surface 102 where the pollutants may collect and settle. Moreover, directing the airflow downwards may concentrate pollutants at or near the base of the leeward side of the leeward wall, which can be useful for collecting the pollutants using a pollution removal device 160.

In some examples, the upper portion 120 of the leeward wall 112 may be formed with a deflector 140. The deflector 140 may be adapted to help direct or guide the airflow downwardly though the airflow passageway 116. For example, the deflector 140 may extend upstream info the airflow (e.g. towards the windward wall 110), and may at least partially, or even completely, overhang the airflow passageway 116. This upstream deflector 140 may help guide airflow downward into the airflow passageway 116.

In some examples, the deflector 140 may be angled. For example, as shown in FIG. 2, the leeway wall 112 may have a main body portion 142 (which in this embodiment is generally vertical), and the deflector 140 may form an angle 144 with the main body portion 142. The angle 144 may be any suitable angle for directing airflow downwardly into the airflow passageway 116. For example, the angle 144 may be an obtuse angle of greater than about 90 degrees. More particularly, the angle 144 may be between about 90 degrees and about 180 degrees. In some particular examples, the angle 144 may be about 135 degrees. In other examples, the angle 144 may be larger or smaller.

The angled deflector 140 generally has a deflector length L. In some examples, the deflector length L may be between about 0.2 meters and about 2 meters. In other examples, the deflector length L could be larger or smaller.

Figure 11:
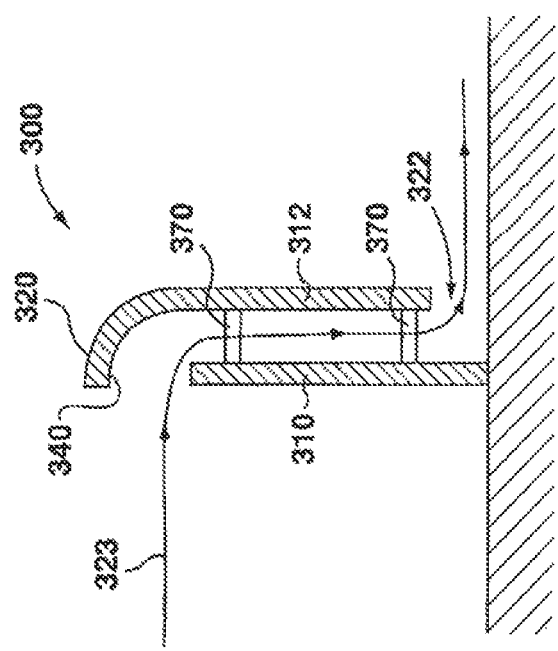
FIG. 11 is a side elevation view of an apparatus for controlling airborne pollution having a leeward wall with a curved deflector according to another embodiment.

While FIGS. 2 and 3 show an angled deflector, in some examples, the deflector 140 may have other shapes and configurations such as a curved deflector (e.g. as shown in FIG. 11).

After flowing downwards through the airflow passageway 116, the portion 123 of the airflow exits through the opening 122 (e.g. as an exhaust airflow 125). In some examples, the opening 122 may be adapted to exhaust the airflow towards a first region 109 of the leeward region 108 that is located at or near the base of the leeward wall 112.

Exhausting the airflow towards the leeward region 108 can help reduce pollutant concentration downwind of the leeward wall 112. For example, in some cases, the exhaust airflow 125 may have a sufficiently high velocity to provide venturi effect. In particular, the high velocity exhaust airflow 125 may create a low pressure, turbulent region near the ground surface. This can generate vertical mixing that may help dilute any remaining airborne pollutants to further reduce downwind pollutant concentration.

The exhaust airflow 125 with increased velocity and turbulence along the ground surface 102 may also help reduce the wake behind the leeward wall 112. This can reduce areas of return flow, which might otherwise allow airborne pollutants to collect in higher concentrations nearby the leeward wall 112.

In some examples, the opening 122 may be located within the leeward wall 112. For example, the leeward wall 112 may have a lower portion 130 located below the first wall height H1, and the opening 122 may be located within the lower portion 130.

As shown in FIG. 2, the opening 122 may be defined by a cutout along the bottom of the lower portion 130 of the leeward wall 112. The opening 122 may extend from an upper edge 132 of the lower portion 130 down to the ground surface 102. In some embodiments, the size of the opening 122 may be between about 0.2-meters and about 2-meters. In other examples, the size of the opening 122 could be larger or smaller.

Providing the opening 122 near the ground surface 102 can be beneficial. For example, when the airflow exits the opening 122 the pollutants are close to the ground surface 102 in the region 109 and the pollutants may fall and settle on the ground surface 102 sooner than if the opening 122 were located at a higher elevation.

While the illustrated example shows a single opening 122, in some examples, there may be more than one opening 122. For example, the walls 110, 112 may extend for some distance along the ground surface (e.g. along a roadway). In such examples, there may be a plurality of openings located intermittently along the leeward wall 112. Furthermore, the openings 122 may be located between uprights 150 that support the leeward wall 112.

While the illustrated example shows the opening 122 being located along the leeward wall 112, in other examples, the opening 122 may have other locations, such as within the ground surface 102 (e.g. via underground piping).

As described above, the apparatus 100 may include a pollution removal device 160 for removing pollutants from the airflow. In some examples, the pollution removal device 160 may include a biological filter. For example, as shown in FIG. 3, the biological filter may include one or more plants such as a shrub, hedge, small tree, or other vegetative material. Plants may help remove pollutants from the airflow by filtering out particles or otherwise capturing or collecting pollutants. Plants also tend be low maintenance and may require little to no manual interaction. Furthermore, plants tend to allow the airflow to pass into leeward region 108 without significantly restricting the airflow velocity.

In other examples, the pollution removal device 160 could include en active water spray system, an electro-static precipitator (ESP), chemical treatments applied to the walls 110, 112 (such as titanium dioxide), other types of air filters, and the like.

In some embodiments, the pollution removal device 160 may be located downwind from the opening 122. For example, as shown in FIG. 2, the pollution removal device 160 may be located on the ground surface 102 downwind of the opening 122 (e.g. in the region 109). In some examples, the pollution removal device 160 may be spaced apart from the opening 122 (e.g. as shown in FIG. 2). In other examples, the pollution removal device 160 may be located generally adjacent to the leeward wall 112 downwind from the opening 122 (as shown in FIG. 3).

Figure 10:
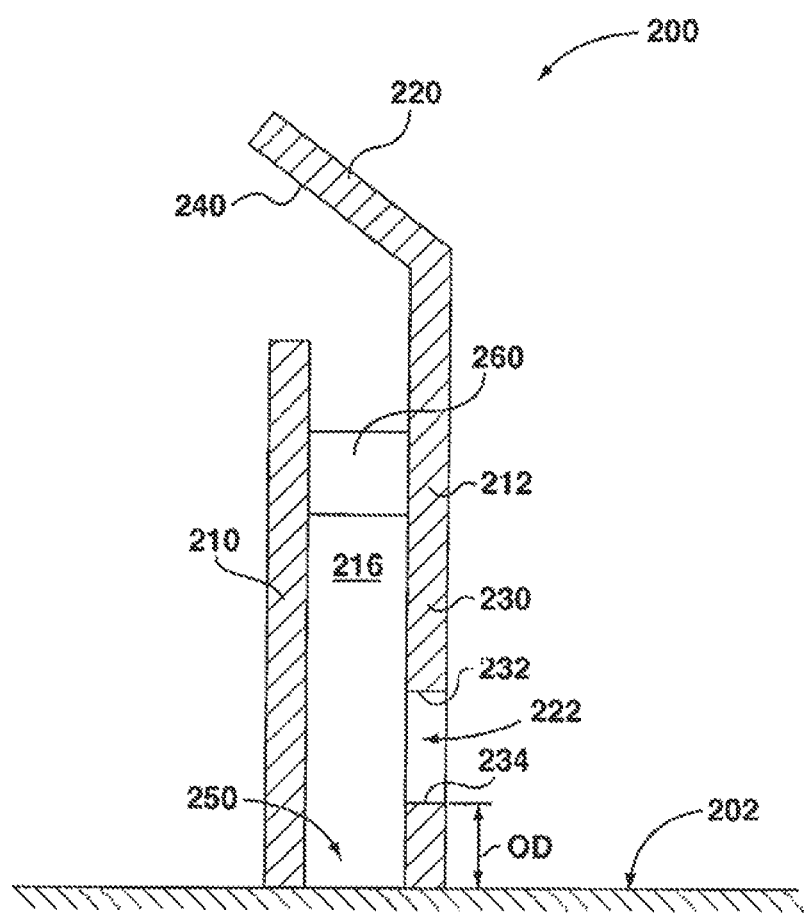
FIG. 10 is a side elevation view of an apparatus for controlling airborne pollution having a leeward wall with an opening located through the leeward wall according to another embodiment.

In some examples, the pollution removal device 160 may have other locations, such as within the airflow passageway 116 (e.g. as shown in FIG. 10), within the opening 122, within the ground surface, and so on.

The walls 110, 112 can be made of any suitable material. For example, the walls may be made from concrete, metal, brick, glass, or other materials, or combinations thereof. In some examples, the walls 110, 112 may be made from, or may include, a noise attenuating material such as a noise absorption material or noise reflecting material.

While the illustrated example shows the apparatus 100 being located on one side of the polluted region 106 (e.g. along one side of a roadway). In some examples, there may be two or more apparatus 100 located on two or more sides of the polluted region 106 (e.g. along opposing sides of a roadway). For example, if the polluted region 106 is a rectangular construction site, apparatus 100 may be placed on all four sides of the site to help control dust pollution.

In some examples, one of the windward wall 110 or the leeward wall 112 may be a pre-existing wall and the other wall may be added as part of a retrofit to the existing wall. For example, one of the windward wall 110 or the leeward wall 112 may be adapted to be mounted to an existing wall structure so as to direct air downwardly between the wall structures.

Referring now to FIGS. 4-9, computer simulations and physical tests were conducted on an exemplary apparatus similar to the one shown in FIGS. 2 and 3.

In the computer simulation, the exemplary apparatus tested included a windward wall having a height of about 4.3-meters and a leeward wall having a height of about 5.5-meters. The walls were spaced apart to provide a passage width of about 35-centimeters. The deflector was angled at about 125-degrees and had a length of 0.8-meters. The opening at the bottom of the leeward wall had a size of about 1-meter. The exemplary apparatus did not include a pollution removal device. Simulations were also conducted without the apparatus (i.e. no wall), and with a standard straight wall having a height of 5 meters.

The computer simulations were conducted using computation fluid dynamics software in a two-dimensional environment having a 1000×600 mesh. In the simulations, the exemplary apparatus was placed 20-meters downwind from a polluted region. The polluted region included a pollution source located 1-meter above the ground surface and pollution was released at a rate of 0.026 kg/s. Separate simulations and tests were conducted with upstream airflows of 1.39-m/s and 2.78-m/s. Data was tracked for 60-meters downwind of the apparatus.

The physical tests were conducted in a wind funnel using a 1:13.5 scale model based on scaled parameters equivalent to the ones used in the computer simulations.

Referring to FIGS. 4 and 5, the simulated average pollutant concentration is shown for (a) no wall, (b) the standard straight wall, and (c) the exemplary apparatus, for upstream airflows of 1.39-m/s and 2.78-m/s, respectively. Based on the graphical representations, the exemplary apparatus reduces the average pollutant concentration downwind from the apparatus in comparison to having (a) no wall and (b) the standard straight wall.

For example, as shown in FIG. 4(c), with an airflow of 1.39 m/s, the average pollutant concentration is generally below 2500 pm at distances beyond about 12-meters downwind of the apparatus. In contrast, as shown in FIG. 4(b), the average concentration does not drop that low until beyond about 20-meters downwind of the standard straight wall.

Similarly, as shown in FIG. 5(c), with an airflow of 2.78 m/s, the average pollutant concentration is generally below 1000 ppm at distances beyond about 15-meters downwind of the apparatus. In contrast, as shown in FIG. 5(b), the average concentration does not drop that low until beyond about 30-meters downwind of the standard straight wall.

Referring to FIGS. 6 and 7, the simulated average airflow velocity is shown for (a) no wall, (b) the standard straight wall, and (c) the exemplary apparatus, for upstream airflows of 1.3-m/s and 2.78-m/s, respectively. Based on the graphical representations, the exemplary apparatus has a smaller wake downwind of the apparatus in comparison to the standard straight wall.

For example, as shown in FIG. 6(b), there is a 10-meter long pocket of stagnant airflow moving at less than 1.0-m/s beyond the standard straight wall. In contrast, as shown in FIG. 6(c), there is only a small 1-meter long pocket of stagnant airflow behind the exemplary apparatus.

Similarly, as shown in FIG. 7, there is a smaller pocket of slower moving air beyond the exemplary apparatus in comparison to the standard straight wall.

As described above, it is believed that decreasing the size of the wake behind the leeward wall may reduce pollutant concentration. For example, a smaller wake may provide fewer stagnant regions for airborne pollutants to collect within. Furthermore, providing a higher velocity airflow through the leeward region may help increase vertical mixing, and thereby dilute fresh air with remaining pollutants to further reduce ground level concentrations.

Referring to FIGS. 8 and 9, there are charts showing the average pollutant concentration at various heights and distances downwind from the standard straight wall and the exemplary apparatus, for upstream airflows of 1.39-m/s and 2.78-m/s, respectively. The charts show results from both the computer simulations and the physical tests.

In almost all cases, the exemplary apparatus provides a lower average pollutant concentration in comparison to the standard straight wall. Furthermore, the exemplary apparatus shows a reduction of average pollutant concentration by up to about 50% relative to the standard straight wall. It is believed that this reduction may be due to one or both of: (a) turbulent mixing generated by the apparatus, or (b) increased airflow velocity through the leeward region.

Referring now to FIG. 10, illustrated therein is another apparatus 200 for controlling airborne pollution according to another embodiment. The apparatus 200 is similar in some respects to the apparatus 100 described previously, and similar elements are given similar reference numerals incremented by one hundred. For example, the apparatus includes a windward wall 210 and a leeward wall 212 with an airflow passageway 216 therebetween. Furthermore, the leeward wall 212 includes an upper portion 220 formed with an angled deflector 240 for directing airflow downward through the airflow passageway 216 towards an opening 222.

In this embodiment, the opening 222 is offset from a ground surface 202 by an offset distance OD. More particularly, the opening 222 extends from an upper edge 232 of the lower portion 230 down to a lower edge 234, which is located above the ground surface 202 by the offset distance OD. In some embodiments, the offset distance OD may be between about 0.2-meters and about 1-meter.

With this configuration it is believed that some airborne pollutants may collect along the ground surface 202 in a collection area 250 located between the walls 210, 212. For example, solid particles entrained in the downward airflow may be propelled into the collection area 250 while the airflow is exhausted through the opening 222.

In some embodiments, the apparatus 200 may include a pollution removal device 260, which may be similar to the pollution removal device 160. As shown in this embodiment, the pollution removal device 260 may be located within the airflow passageway 216.

Referring now to FIG. 11, illustrated therein is mother apparatus 300 for controlling airborne pollution. The apparatus 300 is similar in some respects to the apparatus 100 described previously, and similar elements are given similar reference numerals incremented by two hundred. For example, the apparatus 300 includes a windward wall 310 and a leeward wall 312 with an airflow passageway therebetween. Furthermore, the leeward wall 312 includes an upper portion 320 with a deflector 340 for directing airflow 323 downward through the airflow passageway towards an opening 322.

In this embodiment, the deflector 340 is curved. For example, as shown, the deflector 340 may have a curved shape that at least partially overhangs the airflow passageway. Providing a curved deflector 340 may help to gradually guide the airflow down into the airflow passageway and avoid surface discontinuities which can increase turbulence.

In this embodiment, the leeward wall 312 is supported by the windward wall 310. For example, as shown, one or more mounting brackets 370 may be used to hang the leeward wall 312 from the windward wall 310. The mounting brackets 370 may be secured to each respective wall 310, 312 using fasteners such as bolts, screws, adhesive, and the like.

One benefit of hanging the leeward wall 312 from the windward wall 310 is that the opening 322 is formed as a continuous channel below the leeward wall 312. This can help provide an unrestricted exhaust of the airflow 323.

In some embodiments, the mounting brackets 370 can also be used as part of a retrofit kit to add the leeward wall 312 to a pre-existing straight wall (e.g. the windward wall 310).

Figure 12:
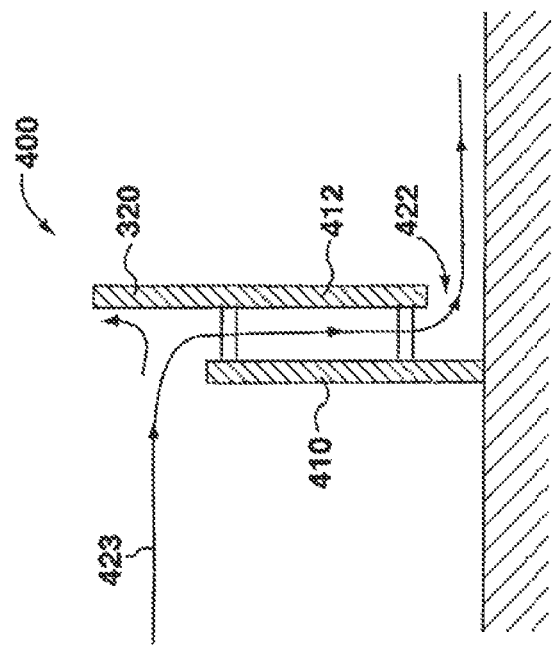
FIG. 12 is a side elevation view of an apparatus for controlling airborne pollution having a leeward wall with a substantially straight upper portion according to another embodiment.

Referring now to FIG. 12, illustrated therein is another apparatus 400 for controlling airborne pollution. The apparatus 400 is similar in some respects to the apparatus 300 described previously, and similar elements are given similar reference numerals incremented by one hundred. For example, the apparatus 400 includes a windward wall 410 and a leeward wall 412 with an airflow passageway therebetween. Furthermore, the leeward wall 412 includes an upper portion 420 for directing airflow 423 downward through the airflow passageway towards an opening 422.

In this embodiment, the upper portion 420 extends generally straight upward from the lower portion without having a deflector. This configuration may be easier to manufacture. Furthermore, it is believed that a portion of the airflow impinging the upper portion 420 will still be directed down info the airflow passageway (e.g. as shown in FIG. 12).

Figure 13:
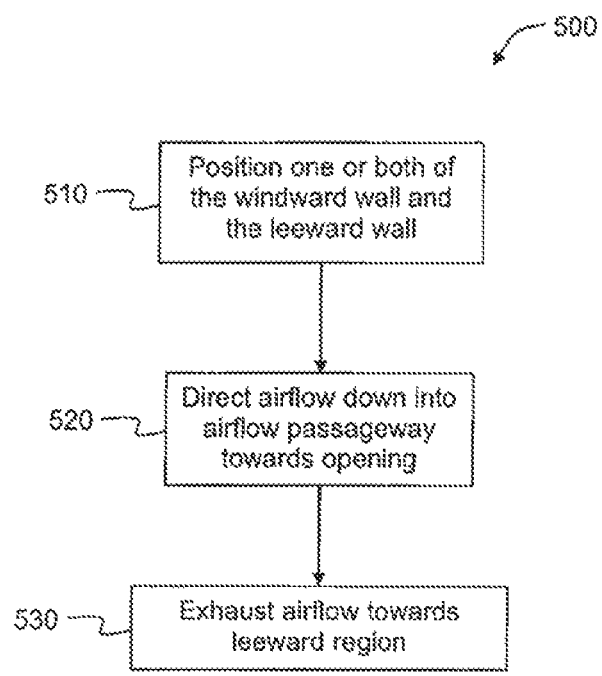
FIG. 13 is a flow chart showing a method of controlling airborne pollution according to another embodiment.

Referring now to FIG. 13, illustrated therein is a flow chart illustrating a method 500 for controlling airborne pollution. The method includes steps 510 and 520.

Step 510 includes positioning at least one of a windward wall and a leeward wall near a polluted region. The walls are positioned such that the windward wall is located between the leeward wall and the polluted region. Furthermore, the leeward wall is spaded apart from the windward wall so as to provide an airflow passageway therebetween.

In some examples, step 510 may include positioning both the walls. For example, both the windward wall and a leeward wall may be positioned contemporaneously. In other examples, one of the walls may be positioned subsequently to the other wall.

In some examples, step 510 may include positioning only one of the walls. For example, one of the walls may be positioned as part of a retrofit to the other wall, which may be a pre-existing wall.

In some examples, step 510 may include modifying a pre-existing wall and then adding the other wall. For example, an existing straight wall may be modified to form the leeward wall by forming an opening at the bottom of the wall, and then, a shorter windward wall may be placed between the leeward wall and the polluted region.

Step 520 includes directing airflow downwards through the airflow passageway towards at least one opening for exhausting the airflow from the airflow passageway.

In some examples, the airflow may be directed downwards through the airflow passageway by an upper portion of the leeward wall that extends upwardly above the windward wall. For example, the upper portion may be formed with a deflector for directing the airflow down into the airflow passageway (e.g. as shown in the examples of FIGS. 2, 3, 10 and 11). Alternatively, the upper portion may be substantially straight and might not include a deflector (e.g. as shown in FIG. 12).

The method 500 may also include step 530 of exhausting the airflow towards a leeward region that is downwind of the leeward wall. In such cases, the opening may be adapted to exhaust the airflow towards the leeward region. For example, the opening may be a located along or through the leeward wall.

While the above description provides examples of one or more apparatus, methods, or systems, it will be appreciated that other apparatus, methods, or systems may be within the scope of the claims as interpreted by one of skill in the art.

The invention claimed is:

1. An apparatus for controlling airborne pollution, the apparatus comprising:
   (a) a leeward wall located near a polluted region; and
   (b) a windward wall located between the leeward wall and the polluted region, the windward wall extending upwardly to a first wall height;
   (c) the leeward wall and the windward wall being spaced apart so as to define an airflow passageway therebetween;
   (d) the leeward wall including an upper portion extending above the first wall height, the upper portion directing airflow from a top opening on a windward side, downward through the airflow passageway, and out at least one opening located in or below the leeward wall and below the first wall height for exhausting the airflow from the airflow passageway;
   (e) wherein the upper portion has a deflector that overhangs the airflow passageway and directs the airflow down into the airflow passageway.

2. The apparatus of claim 1, wherein the at least one opening is adapted to exhaust the airflow towards a leeward region that is downwind of the leeward wall.

3. The apparatus of claim 2, wherein the leeward wall has a lower portion located below the first wall height, and the at least one opening is located through the lower portion.

4. The apparatus of claim 1, wherein the deflector is angled.

5. The apparatus of claim 1, wherein the deflector is curved.

6. The apparatus of claim 1, further comprising at least one pollution removal device for removing pollutants from the airflow.

7. The apparatus of claim 6, wherein the pollution removal device is located downwind from the at least one opening.

8. The apparatus of claim 7, wherein the pollution removal device is located adjacent the leeward wall.

9. The apparatus of claim 6, wherein the pollution removal device includes vegetative material.

10. An apparatus for controlling airborne pollution, the apparatus comprising:
    (a) a leeward wall located near a polluted region;
    (b) a windward wall located between the leeward wall and the polluted region, the windward wall extending upwardly to a first wall height; and
    (c) at least one pollution removal device for removing pollutants from the airflow;
    the leeward wall and the windward wall being spaced apart so as to define an airflow passageway therebetween;
    (d) the leeward wall including an upper portion extending above the first wall height, the upper portion directing airflow downward through the airflow passageway towards at least one opening located in or below the leeward wall and below the first wall height for exhausting the airflow from the airflow passageway;
    (e) wherein the upper portion has a deflector that overhangs the airflow passageway and directs the airflow down into the airflow passageway.

11. The apparatus of claim 10, wherein air flows from a top opening on a windward side, downward through the airflow passageway, and out the at least one opening located in or below the leeward wall.

12. The apparatus of claim 10, wherein the pollution removal device includes any one or more of a vegetative material, a biological filter, an active water spray system, an electro-static precipitator, and a chemical treatment.

13. The apparatus of claim 12, wherein the pollution removal device includes the chemical treatment applied to at least one of the leeward wall and the windward wall.

14. The apparatus of claim 12, wherein the leeward wall has a lower portion located below the first wall height, and the at least one opening is located through the lower portion.

15. The apparatus of claim 10, wherein the at least one opening is adapted to exhaust the airflow towards a leeward region that is downwind of the leeward wall.

16. The apparatus of claim 10, wherein the deflector is angled.

17. The apparatus of claim 10, wherein the deflector is curved.

18. The apparatus of claim 10, wherein the pollution removal device is located adjacent the leeward wall.

* * * * *